(12) United States Patent
Dees et al.

(10) Patent No.: US 12,454,344 B2
(45) Date of Patent: Oct. 28, 2025

(54) TRANSONIC AIRCRAFT WITH TENSION-BASED WING SUPPORT

(71) Applicant: The Boeing Company, Arlington, VA (US)

(72) Inventors: Paul W. Dees, Snohomish, WA (US); William M. Sampedro-Thompson, Mill Creek, WA (US); Bret Alan Bowers, Langley, WA (US); Robert E. Grip, Rancho Palos Verdes, CA (US); Neal A. Harrison, Snohomish, WA (US); Alan C. Simonini, Seattle, WA (US); Theodore K. Rothaupt, Lancaster, CA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/344,033

(22) Filed: Jun. 29, 2023

(65) Prior Publication Data
US 2025/0002135 A1    Jan. 2, 2025

(51) Int. Cl.
*B64C 3/18*    (2006.01)
*B64C 3/14*    (2006.01)

(52) U.S. Cl.
CPC .......... *B64C 3/18* (2013.01); *B64C 2003/149* (2013.01)

(58) Field of Classification Search
CPC .......... B64C 1/26; B64C 39/068; B64C 39/08
See application file for complete search history.

(56) References Cited

U.S. PATENT DOCUMENTS

| 1,756,463 | A | * | 4/1930 | Jezek | B64C 37/00 244/49 |
|---|---|---|---|---|---|
| 1,861,902 | A | | 6/1932 | Bellanca | |
| 2,017,207 | A | | 10/1935 | Hathorn | |
| 2,073,350 | A | | 3/1937 | Osborn | |
| 2,277,242 | A | * | 3/1942 | Makaroff | B64C 39/08 244/135 R |
| 2,398,160 | A | * | 4/1946 | Silver | F16G 11/12 403/46 |
| 6,340,134 | B1 | * | 1/2002 | Meschino | B64C 1/26 244/45 R |
| 10,933,970 | B2 | | 3/2021 | Harrison et al. | |
| 2010/0320326 | A1 | | 12/2010 | Toews | |
| 2016/0001874 | A1 | | 1/2016 | Pitt et al. | |
| 2017/0183080 | A1 | | 6/2017 | Genty De La Sagne | |
| 2018/0281922 | A1 | | 10/2018 | Sclafani et al. | |

(Continued)

FOREIGN PATENT DOCUMENTS

CN    207580184 U    7/2018

OTHER PUBLICATIONS

European Patent Office, "Extended European Search Report", issued in connection with EP Patent Application No. 24175337.5 on Nov. 11, 2024, 12 pages.

*Primary Examiner* — Timothy D Collins
*Assistant Examiner* — Terri L Filosi
(74) *Attorney, Agent, or Firm* — Hanley, Flight & Zimmerman, LLC

(57) ABSTRACT

Apparatus and articles of manufacture are disclosed of an aircraft comprising: a brace to support a wing of the aircraft, the brace including a first end coupled to the wing and a second end coupled to a fuselage of the aircraft, the brace including: a strut extending between the first end and the second end; and an airfoil having a cavity containing the strut.

18 Claims, 12 Drawing Sheets

(56) References Cited

U.S. PATENT DOCUMENTS

| | | |
|---|---|---|
| 2019/0291846 A1* | 9/2019 | Harrison ................ B64C 39/08 |
| 2023/0046394 A1 | 2/2023 | Sampedro-Thompson et al. |
| 2023/0140102 A1 | 5/2023 | Grip et al. |

* cited by examiner

TRANSONIC AIRCRAFT WITH TENSION-BASED WING SUPPORT

FIELD OF THE DISCLOSURE

This disclosure relates generally to aircraft and, more particularly, to apparatus to stabilize wings of transonic aircraft.

BACKGROUND

In transonic aircraft, a wing strut may be used to brace the aircraft wings. Typically, the wing strut carries both tension and compression loads. Such struts may further include a jury-strut to avoid buckling.

Figure 1:
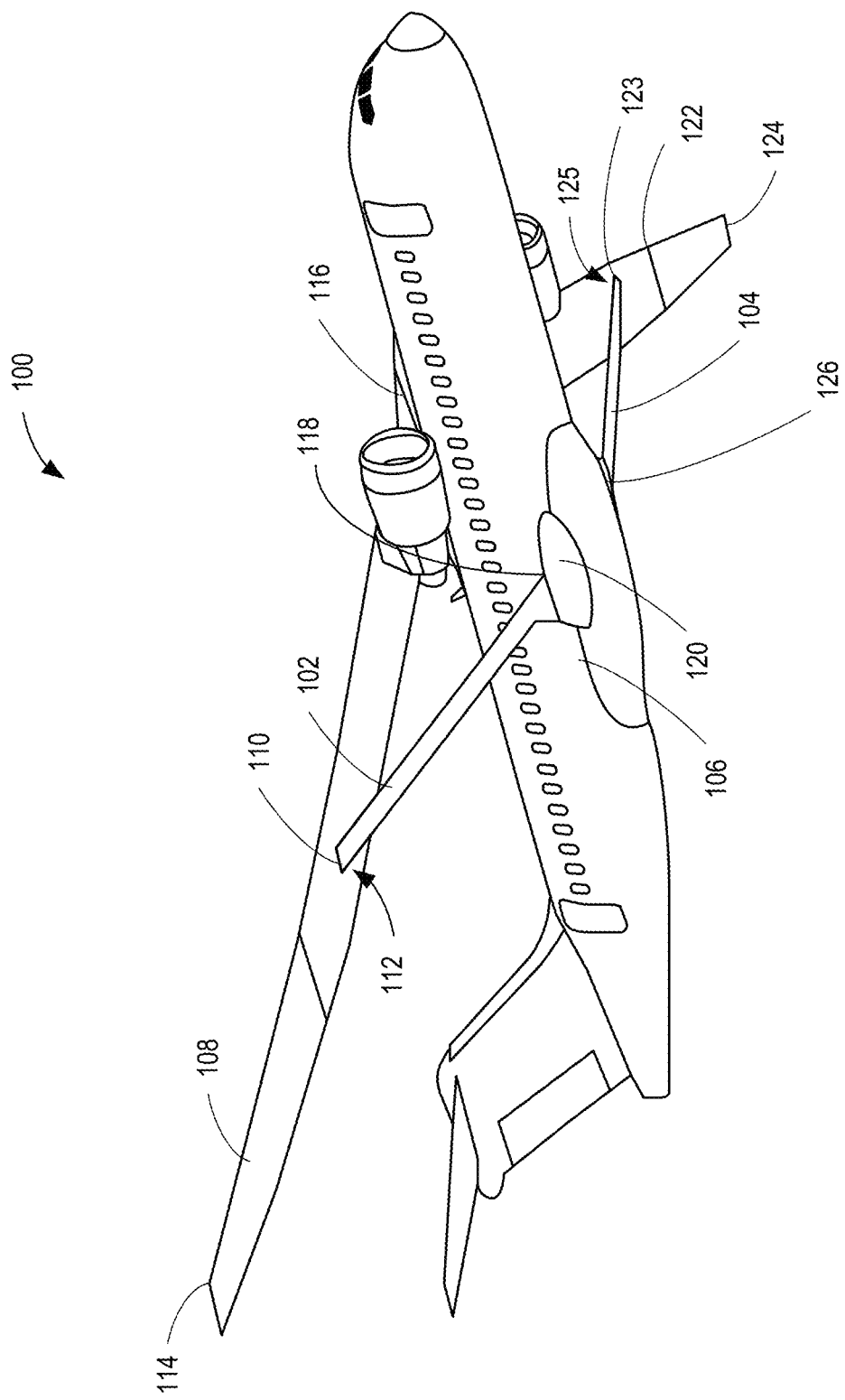
FIG. 1 illustrates an example aircraft that includes an example brace in accordance with this disclosure.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real-world imperfections as will be understood by persons of ordinary skill in the art. For example, "approximately" and "about" may indicate such dimensions may be within a tolerance range of +/−10% unless otherwise specified in the below description.

DETAILED DESCRIPTION

Wing structures of transonic aircraft vary due to different performance capabilities. The wing structure of a truss-braced wing allows for a greater wingspan than that of a cantilever wing. Also, a truss-braced wing has structural components that weigh less than structural components of a wing structure of a cantilever wing having the same wingspan. A cantilever wing is a wing structure that does not require external bracing. However, known truss-braced wings include strut members that typically require a jury-strut (e.g., an approximately vertical brace between the wing and the strut) to prevent buckling (e.g., of the strut under a negative one gravitational force (−1 G-force) pushover condition, in which the strut can be in compression). Additionally, typical truss-braced wing structures require a complex wing/strut joint at an outboard end of the strut and require complex strut connections to the wing across the width (e.g., in the chordwise direction) of the strut.

Known transonic truss-braced wing (TTBW) structures include struts that are relatively wide in the chord and thickness directions to carry compression loads. Struts having increased widths in the chord direction increase the wetted area of the strut and can cause weight and drag penalties as a result of increasing the main wingspan. The term "wetted area," as used herein, is the exposed area (e.g., a surface area) of the aircraft (e.g., a wing) and/or strut that interacts with the air (i.e., not including the air inside a propulsion system's flow path). As a result, the weight and/or size of the strut may cause increased skin friction drag penalties. A wider chord strut also reduces a main wing chord to achieve an aero-optimized spanload, which adds challenges to wing systems integration as well as engine integration. A strut with a wider chord also increases aerodynamic interference with the main wing's undersurface at the wing/strut joint. The wider chord strut integrates best into the main landing gear pylon at a far enough aft location that the reaction load at the wing/strut joint creates a large component load pulling aft on the wing adding load at the wing's side of body). Additionally, a typical transonic truss-braced wing has a strut that carries both tension and compression loads on a thin strut, which requires a jury-strut to avoid buckling and a structurally complex wing/strut joint at the outboard end of the strut.

Examples disclosed herein provide tension load relief for a transonic wing of an aircraft via a structural member that predominantly carries only tension and has less weight and drag with improved systems integration compared to known transonic truss-braced wing aircraft (e.g., a National Aeronautical and Space Administration (NASA) Subsonic Ultra Green Aircraft Research (SUGAR) configuration). Examples disclosed herein decrease weight and drag penalties of aircraft wing braces while also providing a brace in substantial tension and in minimal, if any, compression. For example, examples disclosed herein provide for a brace with reduced (e.g., minimal) wetted area relative to the wing's span (e.g., to reduce drag compared to conventional truss-braced wing structures). For example, examples disclosed herein improve efficiency by decreasing a strut chord by configuring the strut to take mostly tension load (e.g., instead of both tension at positive loading and substantial amounts of compression at negative loading conditions). Such a configuration reduces weight and drag, as well as complexity of the outboard joint. Example braces disclosed herein also enable removal of a jury strut (e.g., an approximately vertical brace or structure between a wing and a strut). An inboard main wing and/or wing structural box chord can be increased to absorb negative loads and/or add lift no longer carried by the strut, better enabling engine and systems integration while still maintaining a high wingspan and aspect ratio (e.g., similar to an aspect ratio of a known TTBW). Thus, examples disclosed herein provide for improved fuel consumption. Additionally or alternatively, example braces described herein allow for less complex wing to brace connections (e.g., couplings and/or attachments). Furthermore, examples disclosed herein reduce noise produced by aircraft by reducing drag forces during noise-critical phases of flight. The improved fuel consumption and reduced drag penalties significantly improve aircraft efficiency and/or performance.

Examples disclosed herein enable changes in both strut and wing chord distribution given that the strut does not carry wing lift (e.g., as compared to known wing struts of TTBW). Example struts and/or braces disclosed herein are primarily tension-only structural members (e.g., struts, chords, beams, etc.) that extend between a lower side-of-body and a wing underside instead of a truss structure that takes both tension and compression loads. As used herein, tension-only means that the strut takes mainly loads in tension and takes negligible compression loads. Some example braces disclosed herein include tension struts enclosed by an aerodynamic fairing. Example braces disclosed herein are mass-balanced to reduce flutter or provide flutter-free characteristics given that the example braces are a slender, quasi-flexible tension member that carry minimal or negligible compression loads.

FIG. 1 illustrates an example aircraft 100 in accordance with this disclosure. The aircraft 100 of the illustrated example includes a first example brace 102 and a second example brace 104. In some examples, the first brace 102 and the second brace 104 are referred to as stabilizers. Specifically, the first brace 102 of the illustrated example is coupled to a first wing 108 and the second brace 104 of the illustrated example is coupled to a second wing 122. The first and second braces 102, 104 of the illustrated example limit movement of respective first and second wings 108, 122 (e.g., reduce bending loads and flutter), thereby stabilizing the first and second wings 108, 122.

The aircraft 100 of the illustrated example includes a fuselage 106. The first wing 108 and the second wing 122 are coupled (e.g., attached) to the fuselage 106 via a fuselage connection 116 (e.g., a wing-to-fuselage structural attachment). In the illustrated example, a first end 110 of the first brace 102 is coupled to the first wing 108 at, or approximately at, a midpoint 112 (e.g., halfway) between a first wing tip 114 of the first wing 108 and the fuselage connection 116. While FIG. 1 illustrates the first end 110 coupled approximately to the midpoint 112 of the first wing 108, the examples herein shall not be limited to this example. In other instances, the first end 110 can be coupled to the first example wing 102 at a location between the midpoint 112 and the wing tip 114. For example, the first end 110 of the first brace 102 can be coupled to the first example wing 102 at a location (e.g., two-thirds) between the midpoint 112 and the wing tip 114 (e.g., at a point closer to the wing tip 114 or at a point closer to the fuselage connection 116). In some examples, the first end 110 of the first brace 102 can be coupled to the first wing 108 between the midpoint 112 and the fuselage connection 116. Further, a second end 118 of the first brace 102 of the illustrated example is coupled to the fuselage 106. In some examples, landing gear is housed within the second end 118. Thus, in some examples, the second end 118 includes a wider main landing gear pylon 120 to house the landing gear.

Likewise, the second brace 104 of the illustrated example is coupled to the fuselage 106 and the second wing 122. In some examples, a first end 123 of the second example brace 104 is coupled to the second example wing 122 at, or approximately at, a midpoint (e.g., halfway) 125 between a second wing tip 124 and fuselage connection 116. In other instances, the first end 123 of the second brace 104 can be coupled to the second wing 122 at any location between the midpoint 125 and the wing tip 124. For example, the first end 123 of the second brace 104 can be coupled to the second example wing 122 (e.g., two-thirds) between the midpoint 125 and the wing tip 124 (e.g., at a point closer to the wing tip 124 or at a point closer to the fuselage connection 116). In some examples, the first end 123 of the second brace 104 can be coupled to the second wing 122 between the midpoint 125 and the fuselage connection 116. Further, a second end 126 of the second brace 104 is coupled to the fuselage 106. In some examples, the configuration of the first brace 102 to the first wing 108 and the fuselage 106 mirrors the configuration of the second brace 104 to the second wing 122 and the fuselage 106. In some examples, landing gear is housed within the second end 126. Thus, in some examples, the second end 126 includes a wider main landing gear pylon (e.g., similar to the landing gear pylon 120) to house the landing gear.

In operation (e.g., during flight, takeoff and/or landing), the first brace 102 and the second brace 104 reduces the bending of the respective first wing 108 and the second wing 122. As a result, each of the first brace 102 and the second brace 104 stabilizes the respective first wing 108 and the second wing 122 in torsion to resist bending by carrying a tension load. Specifically, the first brace 102 and the second brace 104 of the illustrated example provide tension load relief for a transonic wing provided by wings 108, 122 via the first brace 102 and the second brace 104 that have less weight and/or drag with improved systems integration compared to known transonic truss-braced Wing aircraft (e.g., a NASA SUGAR configuration).

Figure 2B:
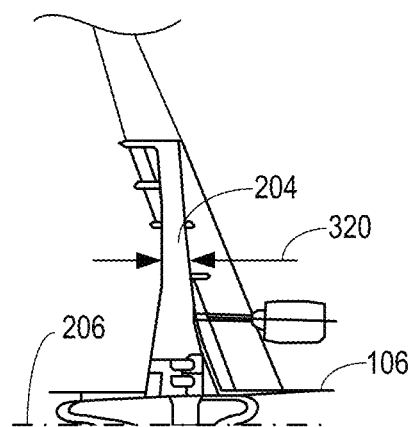
FIG. 2B illustrates an example underside of a known aircraft design with a known wing and wing strut.
Figure 2A:
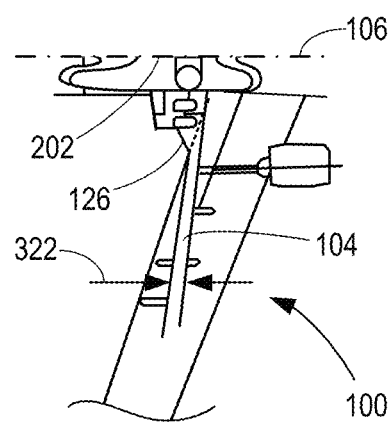
FIG. 2A illustrates an example underside of the example aircraft of FIG. 1 including the example brace disclosed herein.

FIG. 2A illustrates an underside 202 of the example aircraft 100 including the example brace 104 coupled to the fuselage 106. In contrast, FIG. 2B illustrates a known strut 204 coupled to the fuselage 106. Referring to FIG. 2A and FIG. 2B, the known strut 204 of FIG. 2B is significantly wider (e.g., in the chordwise direction 320) than the example brace 104 shown in FIG. 2A. A reduction in width (e.g., in the chordwise direction 322) provided by the example brace 104, shown in FIG. 2A, results in a reduction of wetted area and, thus, a reduction in skin friction drag forces. In the illustrated example, the second end 126 of the example brace 104 increases in the chord direction on the inboard end of the example brace 104 as it integrates into the landing gear pylon 120. In some examples, the reduction in width between the known strut 204 of FIG. 2B and the example brace 104 of FIG. 2A results in reduced weight to the aircraft 100 (e.g., thereby improving fuel efficiency).

Figure 2D:
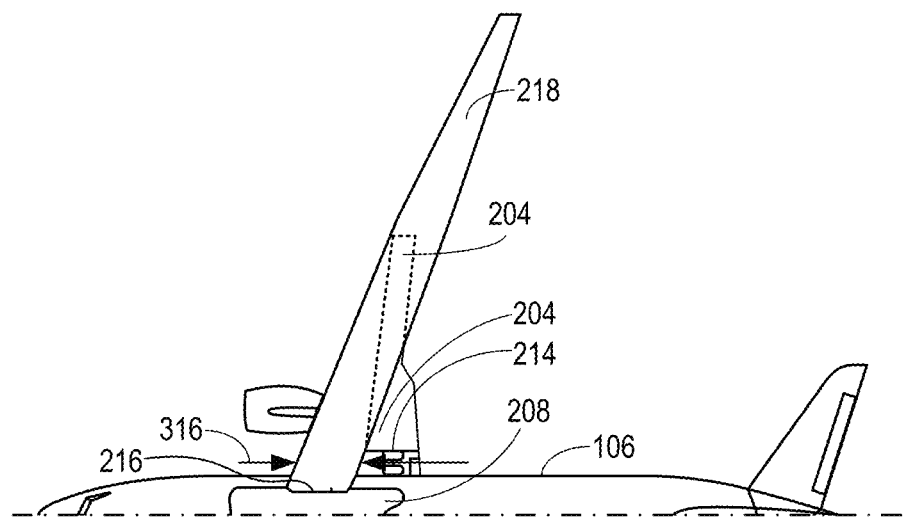
FIG. 2D illustrates a top view of the known aircraft and the known wing and wing strut of FIG. 2B.
Figure 2C:
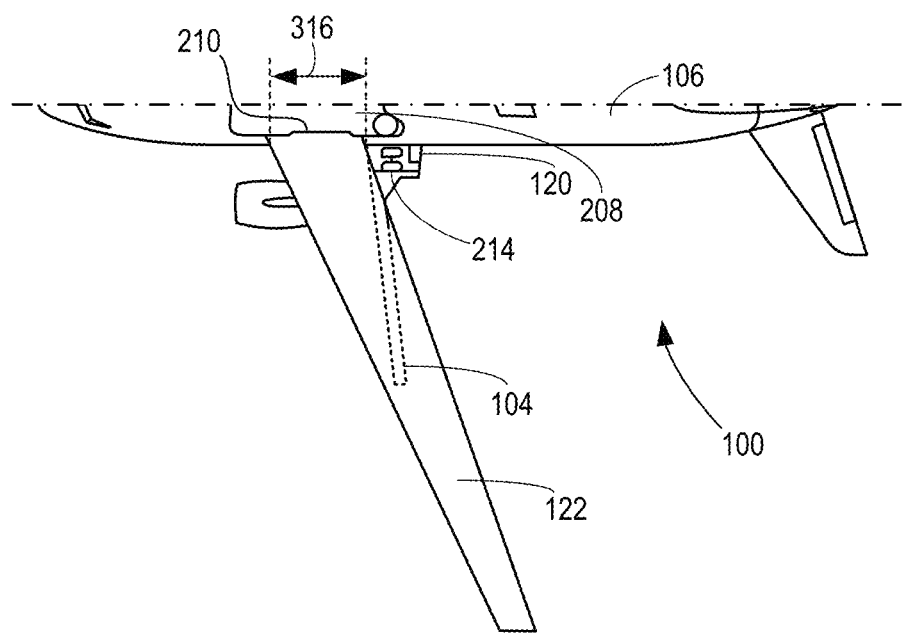
FIG. 2C illustrates a top view of the example aircraft of FIG. 2A.

FIG. 2C illustrates a top view of the example aircraft 100 including the example brace 104 of FIG. 2A coupled to a wing-to-body fairing 208 (e.g., the fuselage connection 116) of the fuselage 106. Referring to FIG. 2C, the wing-to-body fairing 208 is located on a top section of the fuselage 106 and forms a structural center for the attachment of the first wing 108 and the second wing 122. As shown in FIG. 2C, a wing-to-fuselage structural attachment 210 connects the wing 122 to the fuselage 106. In some examples, the second wing 122 attaches to the aircraft 100 via a centerline joint where structure (e.g., a frame) joins the second wing 122 to the fuselage 106.

In contrast, FIG. 2D illustrates the known strut 204 of FIG. 2B coupled to the fuselage 106. Comparing FIGS. 2C and 2D, the wing-to-fuselage structural attachment 210 of FIG. 2C is wider in a chord direction 316 compared to a known wing-to-fuselage structural attachment 216 of FIG. 2D. Typically, the known wing 218 of FIG. 2D has the known strut 204 that carries both tension and compression loads on a thinner strut (i.e., the known strut 204), thereby requiring a jury-strut to avoid buckling of the strut and a structurally complex wing/strut joint at the outboard end of the known strut 204. A jury-strut is typically an approximately vertical support member (e.g., a beam, a rod, etc.) that extends between an underside of the wing and an upper surface of the known strut 204.

In contrast, the example brace 104 of the example wing 122 of FIG. 2C absorbs primarily tension load (e.g., and negligible compression loads). In some examples, the example brace 104 takes (e.g., only) tension load (e.g., and negligible compression loads). Additionally, the jury strut is eliminated or not needed. The example brace 104 of the illustrated example reduces weight and drag, as well as complexity of the outboard joint.

Furthermore, referring to FIG. 2C, the example wing 122 has an increase in length in the chord direction to absorb or handle negative loads and increase lift (e.g., lift that would be otherwise carried by the known strut 204). Additionally, the example wing 122 facilitates engine and systems integration while maintaining a high wingspan and/or aspect ratio (e.g., a wingspan and aspect ratio similar to (e.g., identical to) a wingspan and/or aspect ratio of the known wing 218 of FIG. 2D). Providing a wing that is wider in the chord direction increases lift and, thus, maintains wing spanload efficiency.

As illustrated in FIG. 2C, the example brace 104 is located on an underside of the first wing 122. FIG. 2C further illustrates the landing gear pylon 120 to house and/or store landing gear 214. In some examples, the landing gear 214 includes retractable wheels that move between retracted and extended positions. During landing of the aircraft 100, the retractable wheels are deployed in the extended position outside the landing gear pylon 120 to land the aircraft 100. During flight (e.g., a non-landing event), the retractable wheels are housed and/or stored inside the landing gear pylon 120 to reduce drag.

Figure 3A:
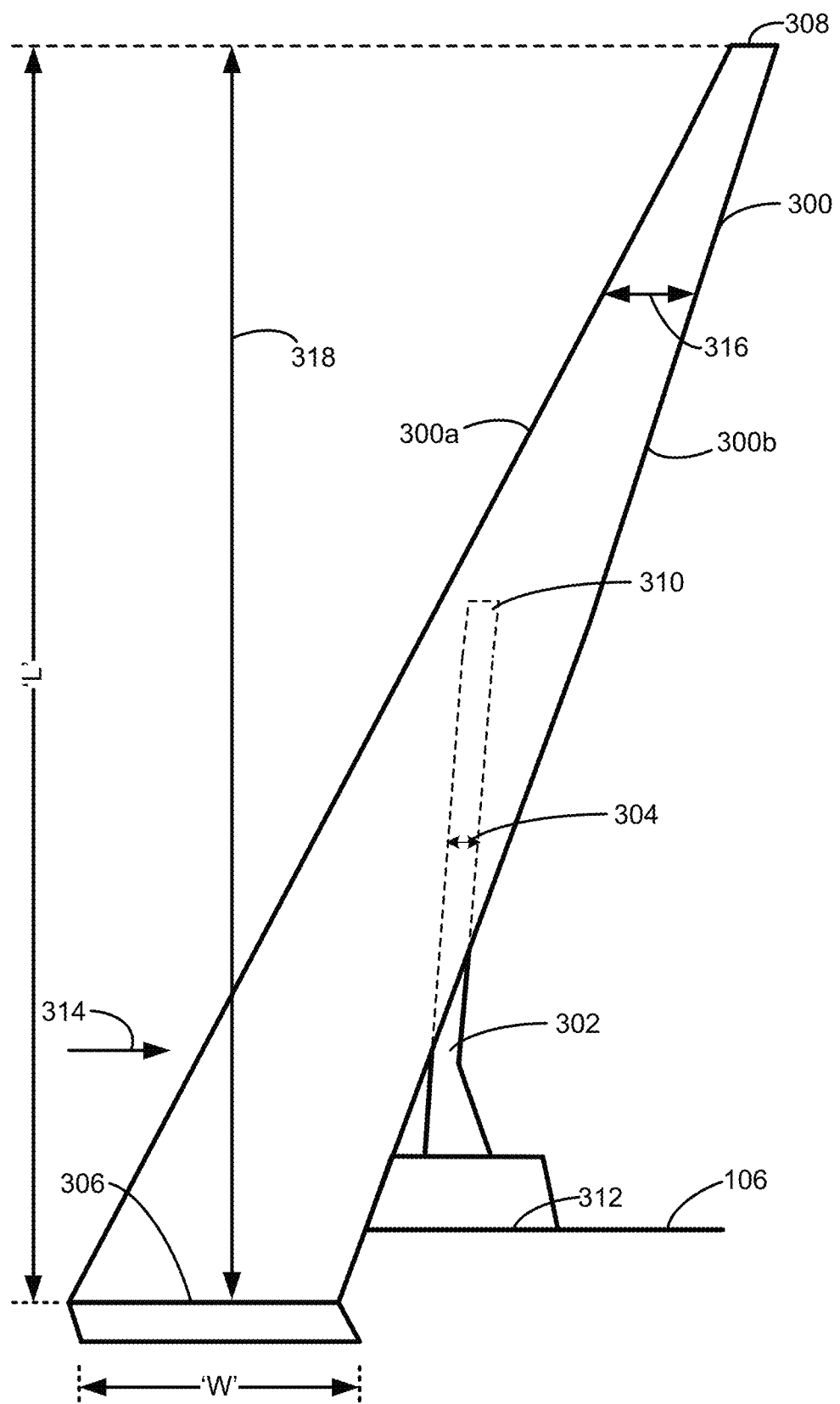
FIG. 3A illustrates a top view of an example wing with another example brace disclosed herein.

FIG. 3A illustrates a top view of an example wing 300 and an example brace 302 that can implement the example wings 108, 122 and the example braces 102, 104 described herein. Thus, the wing 300 corresponds to the first wing 108 and/or the second wing 122 and the brace 302 corresponds to the example first brace 102 and/or the example second brace 104 shown in FIGS. 1, 2A and 2C. The brace 302 of the illustrated example has a width 304 that is relatively narrow (e.g., relative to a width of the known strut 204 shown in FIG. 2B), resulting in the wing 300 increasing in length ('L') and wing chord width ('W'). As noted above, the relatively narrow configuration of the brace 302 decreases drag forces and/or weight as compared to the known strut 204 of FIGS. 2B and 2D. Increasing the wing 300 dimensions in length ('L') and width ('W') improves the lift capabilities of the aircraft 100 (FIG. 1). The length ('L') extends between a wing-to-fuselage structural attachment 306 (e.g., the fuselage connection 116 and/or the wing-to-body fairing 208) and a wing tip 308. In other words, the length ('L') represents half of a wingspan of the aircraft 100. The chord direction 316, as used herein, corresponds to a direction parallel to an airflow 314 and/or a direction between a leading edge 300a of the wing 300 and a trailing edge 300b of the wing 300. The width ('W') extends in the chord direction 316. The width W of the illustrated example increases in the chordwise direction between the centerline of the fuselage and/or aircraft 100 and the wing tip 308 (e.g., compared to the wing 218 of FIG. 2D). Additionally, a spanwise direction 318 corresponds to a direction from the wing tip 308 to the wing centerline 306. In some instances, the wing tip 308 corresponds to the example the first wing tip 114 or the second wing tip 124 shown in FIG. 1. In some examples, the width ('W') represents a root chord of the wing 300. Due to a relatively narrow width 304 of the brace 302, the wing 300 and/or the wing-to-fuselage structural attachment 306 (e.g., inboard chord) increases in length to increase lift of the wing 300 (e.g., lift that is not produced by the brace 302). Increasing the wing 300 in the chord direction (e.g. instead of the brace 302) allows for better engine and/or wing 300 integration while enabling a higher wingspan at a similar (e.g., the same) wing aspect ratio of the known wing of FIGS. 2B and 2D.

Additionally, referring to FIG. 3A, a first end 310 of the brace 302 is coupled to the wing 300 at a point closer to the wing tip 308 than the wing-to-fuselage structural attachment 306. In the illustrated example, the brace 302 is coupled to the wing 300 at a location outboard of an aircraft engine and/or an engine pylon. However, the examples shall not be limited to this arrangement. In some examples, the first end 310 can be coupled or connected to the wing 300 at a location closer to the wing-to-fuselage structural attachment 306 or the midpoint 112 (FIG. 1), as shown in FIG. 3C. In some examples, the brace 302 can couple to the wing 300 at a location inboard of an aircraft engine or engine pylon. In some examples, the brace 302 can couple to the wing 300 at a position closer to the trailing edge than leading edge. In some examples, the brace 302 can couple to the wing 300 at a position closer to the leading edge than the trailing edge. In some examples, the brace 302 can couple to the wing 300 at a midpoint or any other point between the leading edge and the trailing edge. In some examples, the first end 310 corresponds to the first end 110 shown in FIG. 1. Further, the brace 302 extends between the first end 310 coupled to the wing 300 and a second end 312 coupled to the fuselage 106. In some examples, the second end 312 corresponds to the second end 118 shown in FIG. 1.

Figure 3B:
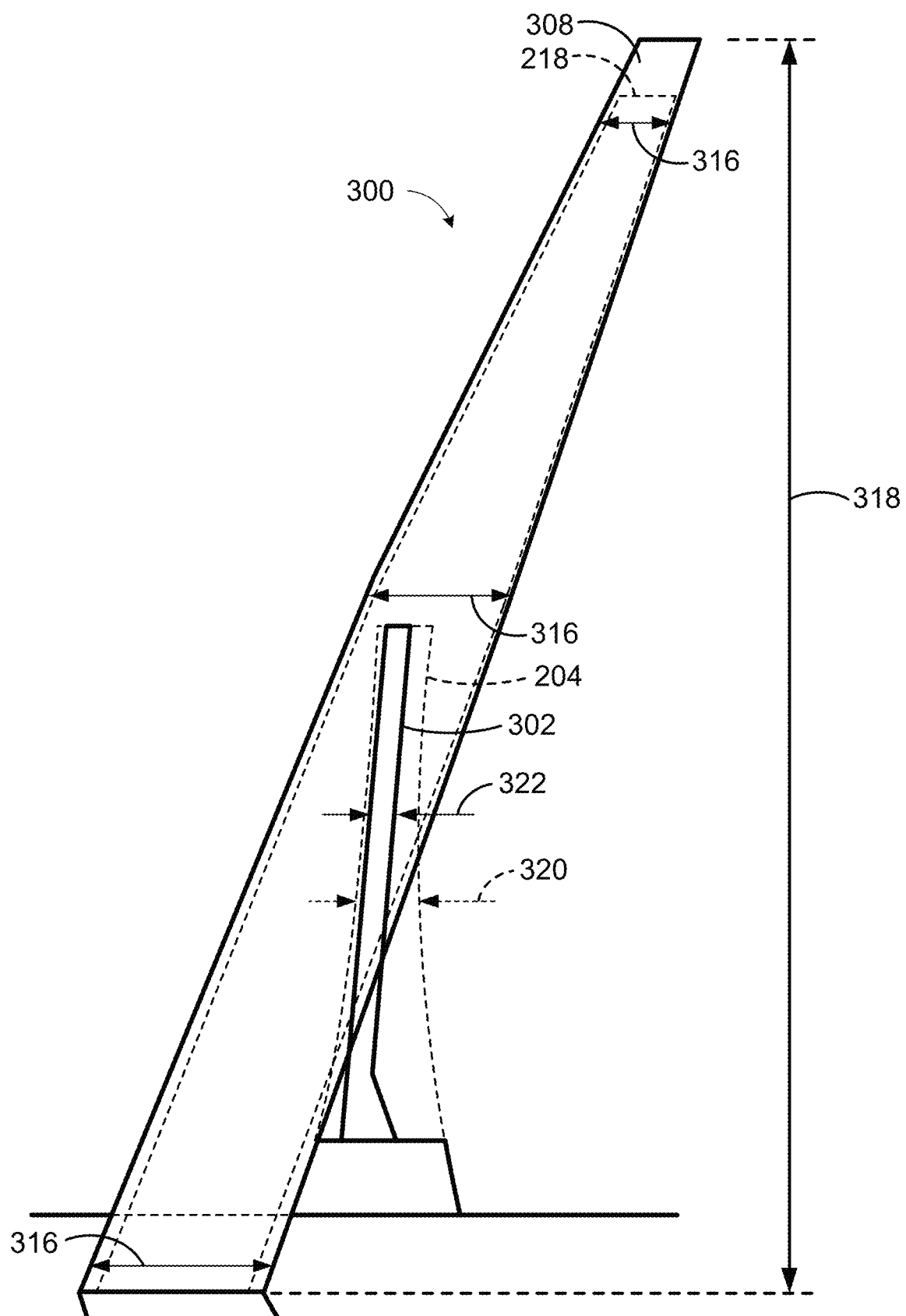
FIG. 3B illustrates the top view of the example wing of FIG. 3A overlaid on the known wing of FIG. 2D. The example wing of FIG. 3A is shown in solid lines and the known wing of FIG. 2D is shown in dashed lines.
Figure 3C:
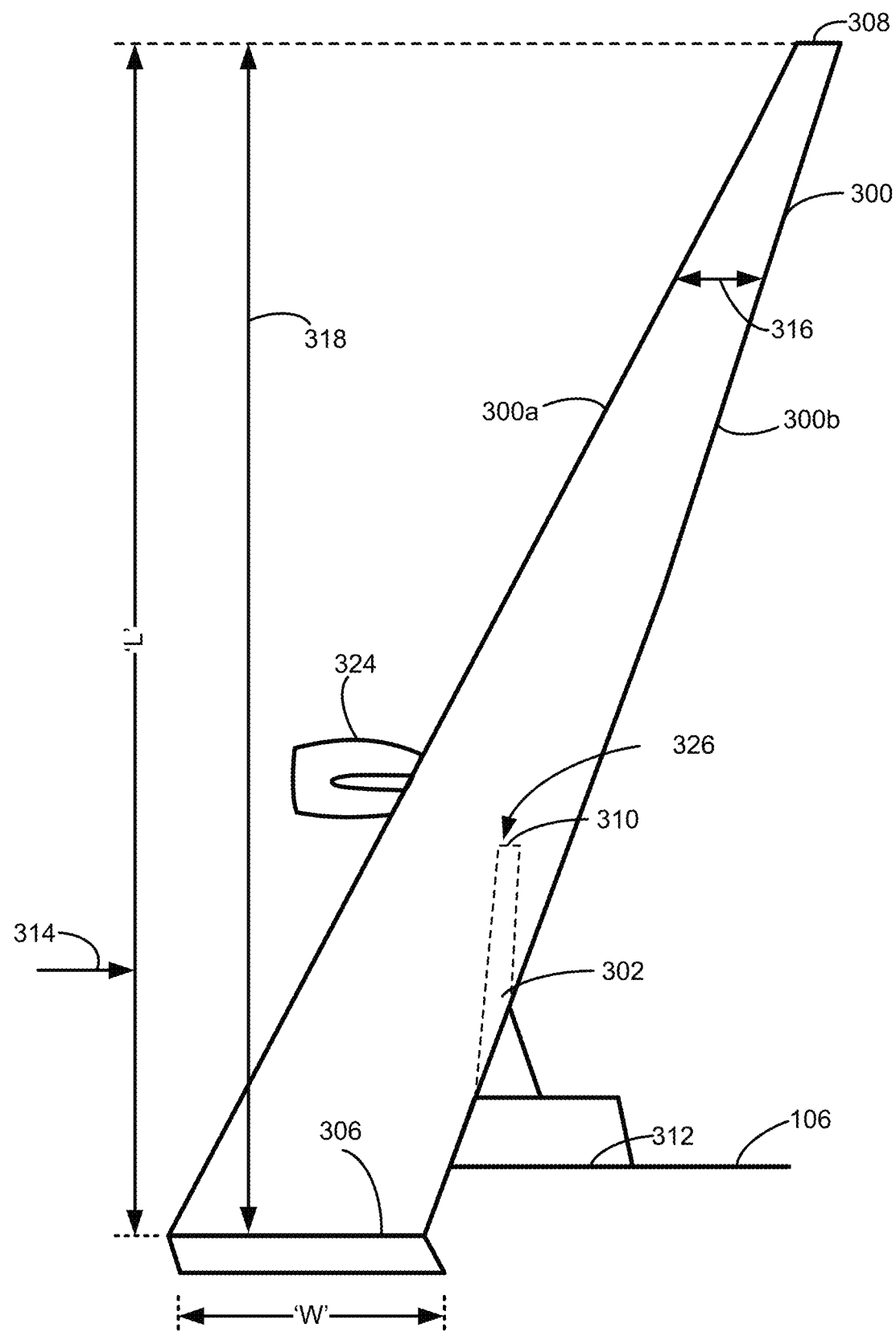
FIG. 3C illustrates a top view of the example wing and the example brace of FIG. 3A with another attachment configuration disclosed herein.

FIG. 3B illustrates the top view of the wing 300 of FIG. 3A overlaid on the known wing 218 of FIG. 2D. The wing 300 and the brace 302 in FIG. 3B are depicted by solid lines and the known wing 218 and the known strut 204 in FIG. 3B are depicted by dashed lines. Referring to FIG. 3B, the wing 300 is larger than the known wing 218 in the chord direction 316 and the spanwise direction 318. In some examples, the wing 300 includes a larger wing chord inboard to optimize lift distribution due to lift capabilities reduced by the example brace 302. Additionally, the example brace 302 is smaller than the known strut 204 in a chord direction 322. The reduction in length of the brace 302 in the chord direction 322 provides a structurally simplified example brace 302 that is primarily a tension member, in contrast to the known strut 204, which is both a tension and compression member. As noted above, the known strut 204 absorbs loads during negative g-force at download. The example wing 300 is larger in the chord direction 316 to take the loads at negative g-force at download and reduces or eliminates the requirement of the brace 302 to absorb such loads. Additionally, to maintain a high wing aspect ratio, the example wing 300 has a larger wingspan in the spanwise direction 318 compared to a wingspan of the known wing 218, which reduces drag. As used herein, the wing aspect ratio is defined as a wingspan squared divided by a wing area.

FIG. 3C illustrates the top view of the wing 300 of FIG. 3A and the example brace 302 with another example brace/wing connection 301 disclosed herein. In this example, the first end 310 of the brace 302 is connected, coupled and/or attached to the wing 300 at a location 326 inboard of an engine 324. In other examples, the first end 310 of the example brace 302 is connected, coupled, and/or attached to the wing 300 at a location outboard of the engine 324. In some examples, the first end 310 of the brace 302 is connected, coupled, and/or attached halfway between a midpoint of the wing 300 and the fuselage 106.

Figure 4A:
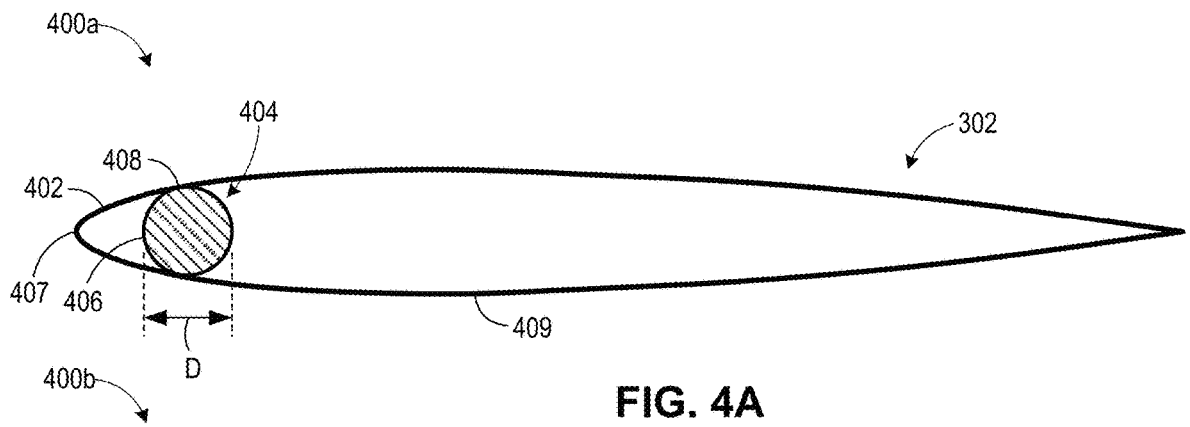
FIG. 4A illustrates an example cross-sectional view of an example brace disclosed herein.

FIG. 4A illustrates an example cross-section 400a of the example brace 302 shown in FIG. 3. The brace 302 (e.g., a brace assembly) of the illustrated example includes an airfoil 402 and a strut 406. The airfoil 402 of the illustrated example is an aerodynamic cover, an aerodynamic skin, aerodynamic fairing, aerodynamic surface, etc. The airfoil 402 of the illustrated example houses or at least partially surrounds (e.g., encases) the strut 406. In some instances, the airfoil 402 provides flutter-free characteristics. In other words, the shape of airfoil 402 provides for attached airflow around the airfoil 402. To provide attached airflow, an outer surface or wetted surface of the airfoil 402 has a substantially smooth surface. In some examples, the airfoil 402 is composed, at least partially, of structural material (e.g., aluminum, etc.) for taking loads while providing light weight fairing substantially similar to the airfoil shape for aeroelastic and/or flutter characteristics. As shown in FIG. 4A, the airfoil 402 has a symmetrical airfoil shaped cross-sectional profile. In some examples, the airfoil 402 includes a non-symmetrical airfoil shaped cross-sectional profile.

The brace 302 of the illustrated example includes a cavity 404 (e.g., between the first end 310 and the second end 312 of FIG. 3A). In some examples, the cavity 404 extends partially between the first and second ends 310, 312 (FIG. 3A). In some instances, the cavity 404 extends the entirety between the first end 310 and the landing gear 214 (FIG. 2). In this example, the cavity 404 has a cylindrical shape and has a circular cross-sectional profile. However, the examples shall not be limited thereto. In this example, the cavity 404 extends between a top 408 of the airfoil 402 and a bottom 409 of the airfoil 402. In other examples, the cavity 404 extends a partial length between the top 408 of the airfoil 402 and the bottom 409 of the airfoil 402. As shown in FIG. 4A, the cavity 404 contains, receives and/or houses the strut 406.

The strut 406 of the illustrated example is cylindrical and has a circular cross-sectional profile. In some examples, the diameter, D, of the circular cross-sectional profile of the strut 406 can range from 1 inch and 4 inches. In some examples, the strut 406 is a cable (e.g., a steel cable). In some examples, the strut 406 includes metal fibers that can be intertwined and/or braided. In some examples, the strut 406 includes non-metal fibers. In some examples, the metal fibers and/or non-metal fibers can be coiled and/or wrapped. In other examples, the metal fibers and/or non-metal fibers are coiled and/or wrapped around a solid middle support. In some examples, the strut 406 is a solid member, such as, a beam and/or rod. In some instances, the strut 406 is a cable, such as, a cord and/or rope. In some examples, a cover with an aerodynamic surface is positioned around the cable.

The strut 406 of the illustrated example is located at, or toward, a first end 407 of the example brace 302. Locating the strut 406 at the first end 407 assures that the example brace 302 weight distribution has a forward center of gravity of the brace 302 and/or forward of the aerodynamic forces. Such configuration enables the strut 406 to be resistant to flutter. In other words, to reduce flutter, a distribution of weight is located forward of the sectional aerodynamic forces. The example weight distribution, with the weight located toward (e.g., close to) the first end 407 (e.g., the leading edge) reduces or prevents flutter in the example brace 302. In this manner, a main structure of the strut 406 is located closer to the leading edge and an aft portion of an aerodynamic fairing (e.g., the airfoil 402) is a lighter weight structure. In other words, a front end or portion of the brace 302 has a greater weight than a rear end or portion of the brace 302. In some examples, a first end of the cable corresponds to the first ends 110, 123. In some examples, the first end of the cable is attached at the midpoint 112, 125 (shown in FIG. 1). In some examples, the cross-sectional shape of the strut 406 can have a shape that is complementary to the cross-sectional shape of the airfoil 402. In other examples, the cross-sectional shape of the strut 406 can have a shape that is an oval or cylindrical shape. In some examples, at least one of the components includes at least one of steel, aluminum, fiberglass, titanium, co-polymer fiber and/or carbon fiber.

FIGS. 4B-4F are cross-sectional views of other example braces 400b-400f disclosed herein. Many of the components of the example braces 400b-400f of FIGS. 4B-4F are substantially similar or identical to the components described above in connection with FIGS. 1-4A. As such, those components will not be described in detail again below. Instead, the interested reader is referred to the above corresponding descriptions for a complete written description of the structure and operation of such components. To facilitate this process, similar or identical reference numbers will be used for like structures in FIGS. 4B-4F as used in FIGS. 1-4A. The example braces 400b-400f of FIGS. 4B-4F may be used to implement the aircraft 100 of FIG. 1.

Figure 4B:
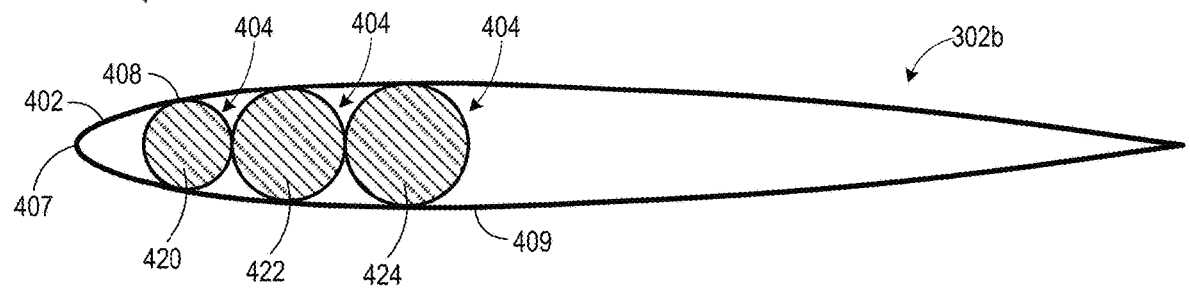
FIG. 4B illustrates a cross-sectional view of another example brace disclosed herein.

FIG. 4B is an example cross-section 400b of another example brace 302b disclosed herein. The brace 302b (e.g., a brace assembly) of the illustrated example includes an airfoil 402 and a first strut 420, a second strut 422, and a third strut 424. The first, second, and third struts 420, 422, 424 of the illustrated example are cylindrical and have a circular cross-sectional profile. In some examples, the first, second, and third strut 420, 422, 424 of are cables (e.g., steel cables). In this example, the brace 302b includes three cavities 404 receives and/or houses the first, second, and third struts 420, 422, 424. In some instances, a slack of the first, second, and third struts 420, 422, 424 are retractable to maintain tension within the strut 406. In some examples, a slack of the first, second, and third struts 420, 422, 424 are stored within the wide connection 120 (shown in FIG. 1). In other examples, the slack of the first, second, and third struts 420, 422, 424 is stored within the fuselage 106. In some examples, a slack of the first, second, and third struts 420, 422, 424 can be retracted by a means for retaining tension. In some examples, each of the first, second, and third struts 420, 422, 424 includes metal fibers that can be intertwined and/or braided. In this example, the example brace 302 includes three struts 420, 422, 424. However, the examples disclosed herein shall not be limited thereto. In some examples, the brace 302b includes more than three struts 420, 422, 424. In other examples, the brace 302b includes two struts 420, 422. In some examples, the first, second, and third struts 420, 422, 424 vary in size (e.g., diameter, length and/or weight). For example, the second strut 422 can be larger than the first strut 420 and the third strut can be larger than the first and second struts 420, 422. In other examples, the first, second, and third struts 420, 422, 424 are approximately equal in size (e.g., a same diameter, a same length and/or a same weight). The first, second, and third struts 420, 422, 424 can include the same material(s) (e.g., steel, aluminum, fiberglass, titanium and/or carbon fiber, etc.) and/or one or more of the struts 420, 422, 424 can include different materials (steel, aluminum, fiberglass, titanium and/or carbon fiber).

Figure 4C:
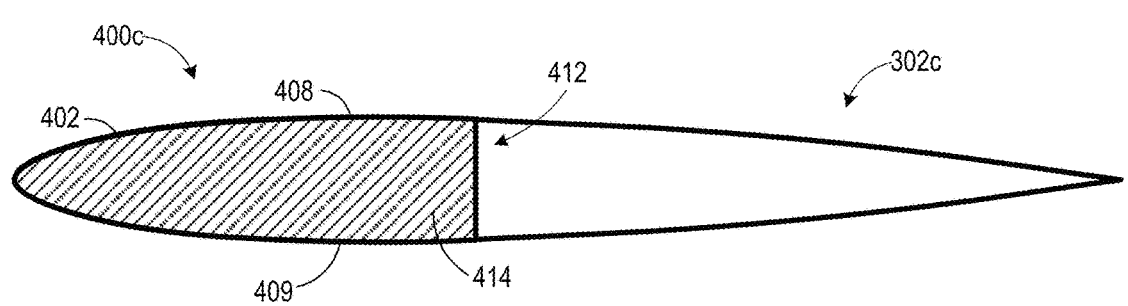
FIG. 4C illustrates a cross-sectional view of another example brace disclosed herein.

FIG. 4C is an example cross-section 400c of another example brace 302c disclosed herein. The examples cross-section 400c includes the airfoil 402 and a cavity 412 (e.g., having a shape of the airfoil 402). In some examples, the cavity 412 extends partially between the first end 310 and the second end 312 (FIG. 3). In some examples, the cavity 412 extends the entirety between the first end 310 and the second end 312 (FIG. 3A). In this example, a strut 414 is contained, received and/or housed within the cavity 412. Thus, the strut 414 of the illustrated example has a cross-sectional shape that is complementary to at least a portion of the shape of the cavity 412. In some instances, the strut 414 can have an oval shape and/or can have any other shape. In some instances, the strut 414 includes metal fibers that may be intertwined and/or braided. In some examples, the strut 414 is a solid member, such as, a beam and/or rod. In some examples, the strut 414 includes steel, aluminum, fiberglass, co-polymer fiber, titanium, and/or carbon fiber. The cross-sectioned portion of the strut 414 of the example cross-section 410 represents a heavier, load-carrying structure near a front section of the brace 302 and an empty portion of the cavity 412 (e.g., the non-cross-sectioned portion) represents a lighter weight of the brace 302 (e.g., an aft aero-fairing). In the examples the strut 414 includes metal (e.g., aluminum, titanium, steel, etc.). In some examples, the strut 414 is robust (e.g., to sustain bird strikes).

Figure 4D:
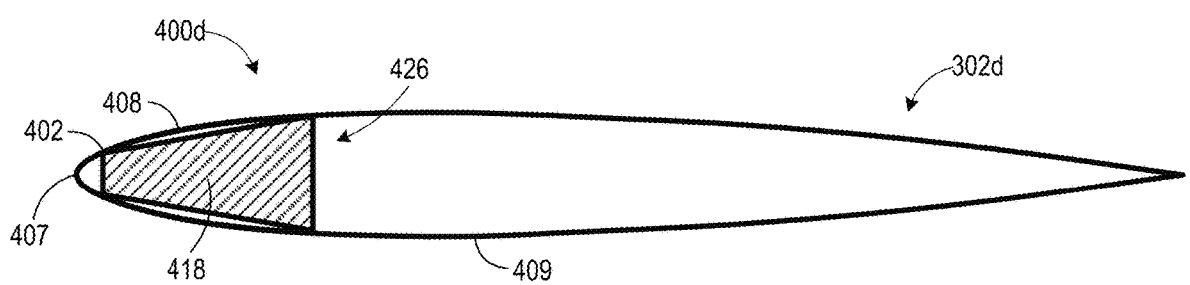
FIG. 4D illustrates a cross-sectional view of another example brace disclosed herein.

FIG. 4D is an example cross-section 400d of another example brace 302d disclosed herein. The example cross-section 400d includes the airfoil 402 and a cavity 426. In some examples, the cavity 426 extends partially between the first and second ends 310, 312 (FIG. 3A). In some instances, the cavity 426 extends the entirety between the first end 310 and the landing gear 214 (FIG. 2). In this example, the cavity 426 has a polygonal prism shape and has a polygonal cross-sectional profile. However, the examples shall not be limited thereto. In this example, the cavity 426 extends between a top 408 of the airfoil 402 and a bottom 409 of the airfoil 402. In other examples, the cavity 426 extends a partial length between the top 408 of the airfoil 402 and the bottom 409 of the airfoil 402. In this example, a strut 418 has an irregular polygonal shape (e.g., trapezoid) and is contained and/or housed within the cavity 426. The strut 418 of the illustrated example is a quadrilateral. However, the examples shall not be limited thereto. In some examples, the strut 418 can be triangular, pentagonal, hexagonal, etc. In some instances, the strut 418 includes metal fibers and/or non-metal fibers that can be intertwined and/or braided. In some examples, the strut 418 is a solid member, such as, a steel beam and/or rod. In some examples, the strut 418 includes steel, aluminum, fiberglass, titanium, co-polymer fiber and/or carbon fiber.

Figure 4E:
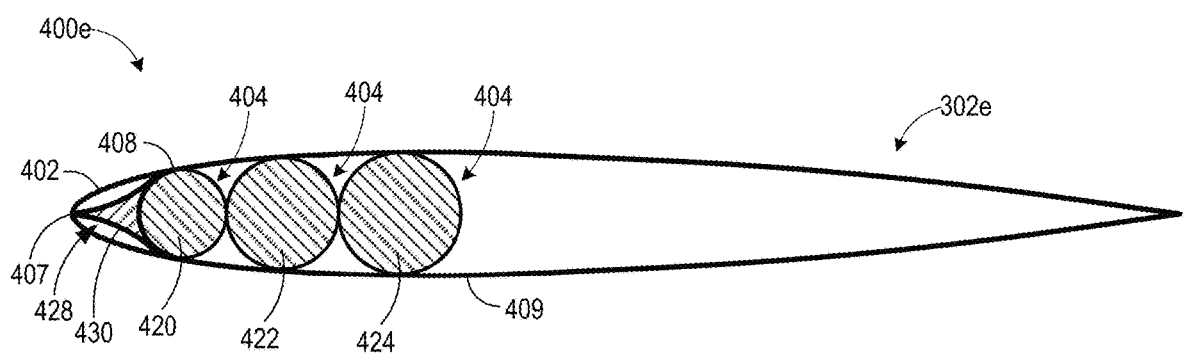
FIG. 4E illustrates a cross-sectional view of another example brace disclosed herein.

FIG. 4E is an alternative example cross section 400e of another example brace 302e disclosed herein. This example illustrates the configuration of FIG. 4B further a strut 430 positioned in the cavity 428. The strut 430 of the illustrated example has a wedge shape and has a substantially triangular cross-sectional profile. However, the examples shall not be limited thereto. In the illustrated example, the strut 430 extends between a top 408 of the airfoil 402 and a bottom 409 of the airfoil 402. Additionally, the strut 430 of the illustrated example is positioned between a leading edge 407 of the brace 302e and the strut 420. In some instances, the strut 430 includes metal fibers that can be intertwined and/or braided. In some examples, the strut 430 is a solid member, such as, a beam and/or rod. The struts 420, 422, 424, 430 can include the same material(s) (e.g., steel, aluminum, fiberglass, titanium and/or carbon fiber, etc.) and/or one or more of the struts 420, 422, 424, 430 can include different materials (steel, aluminum, fiberglass, titanium and/or carbon fiber). In some instances, the strut 430 can be made of a hard material and the front edge 407 can be machined or otherwise arranged to be very sharp, which advantageously functions as a bird splitter in the event of a bird strike. The strut 430 is fixedly attached to the strut 420 directly aft of it to provide adequate load transfer between the strut 430 and the strut 420. In some examples, an end of the strut 430 profile mirrors the profile of the strut 420.

Figure 4F:
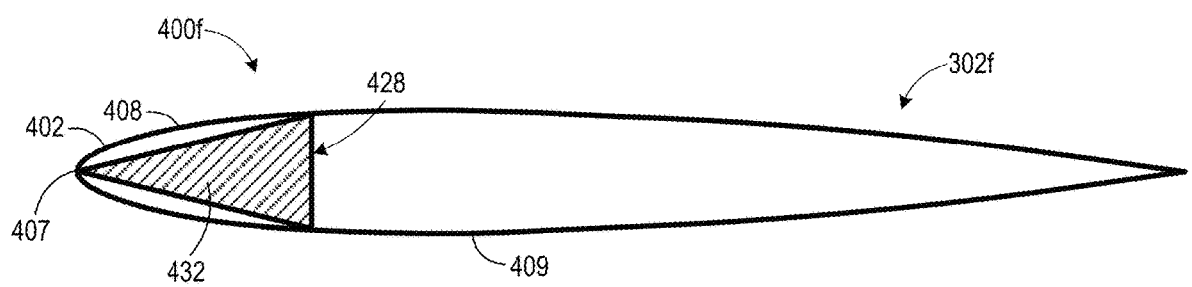
FIG. 4F illustrates a cross-sectional view of another example brace disclosed herein.

FIG. 4F is an example cross section 400f of another example brace 302f disclosed herein. The example cross-section 400f includes the airfoil 402 defining a cavity 428 having an example strut 432. The strut 432 of the illustrated example is a triangular prism. However, the examples shall not be limited thereto. In some instances, the strut 432 includes metal fibers and/or non-metal fibers that can be intertwined and/or braided. In some examples, the strut 432 is a solid member, such as, a steel beam and/or rod. In some instances, a slack of the strut 432 is retractable to maintain tension within the strut 432. In some examples, a slack of the strut 432 can be stored within the wide connection 120 (shown in FIG. 1). In other examples, the slack of the strut 432 is stored within the fuselage 106. In some examples, the strut 432 includes steel, aluminum, fiberglass, titanium, co-polymer fiber and/or carbon fiber.

Furthermore, the struts 406, 414, 420, 422, 424, 430, 432 (shown in FIGS. 4A-E, respectively) carry substantial tension loads as compared to compression loads. As used herein, the term substantial refers to a range from 98% to 99.9% of the tension loads. In other words, the struts 406, 414, 420, 422, 424, 430, 432 carry negligible compression load(s). Carrying a substantial tension load enables a clearance in a length of the struts 406, 414, 420, 422, 424, 430, 432 in the chord direction. The smaller cross-sectional area of the struts 406, 414, 420, 422, 424, 430, 432, the smaller the chord direction because the struts 406, 414, 420, 422, 424, 430, 432 have a range of thickness divided by the chord. In some examples, the range of thickness divided by the chord includes 8 to 10 percent. The smaller chord direction results in less wetted area, which reduces the weight and/or drag of the braces 302, 302b-302f (shown in FIG. 3). Furthermore, a reducing in length in the chord direction reduces the complexity of coupling between the first end 310 and the wing 300 (shown in FIG. 3). In some examples, the struts 406, 414, 420, 422, 424, 430, 432 are quasi-flexible. However, the tension loads provided by the braces 302, 302b-302f reduces the bending moment of the wing 300.

Figure 5:
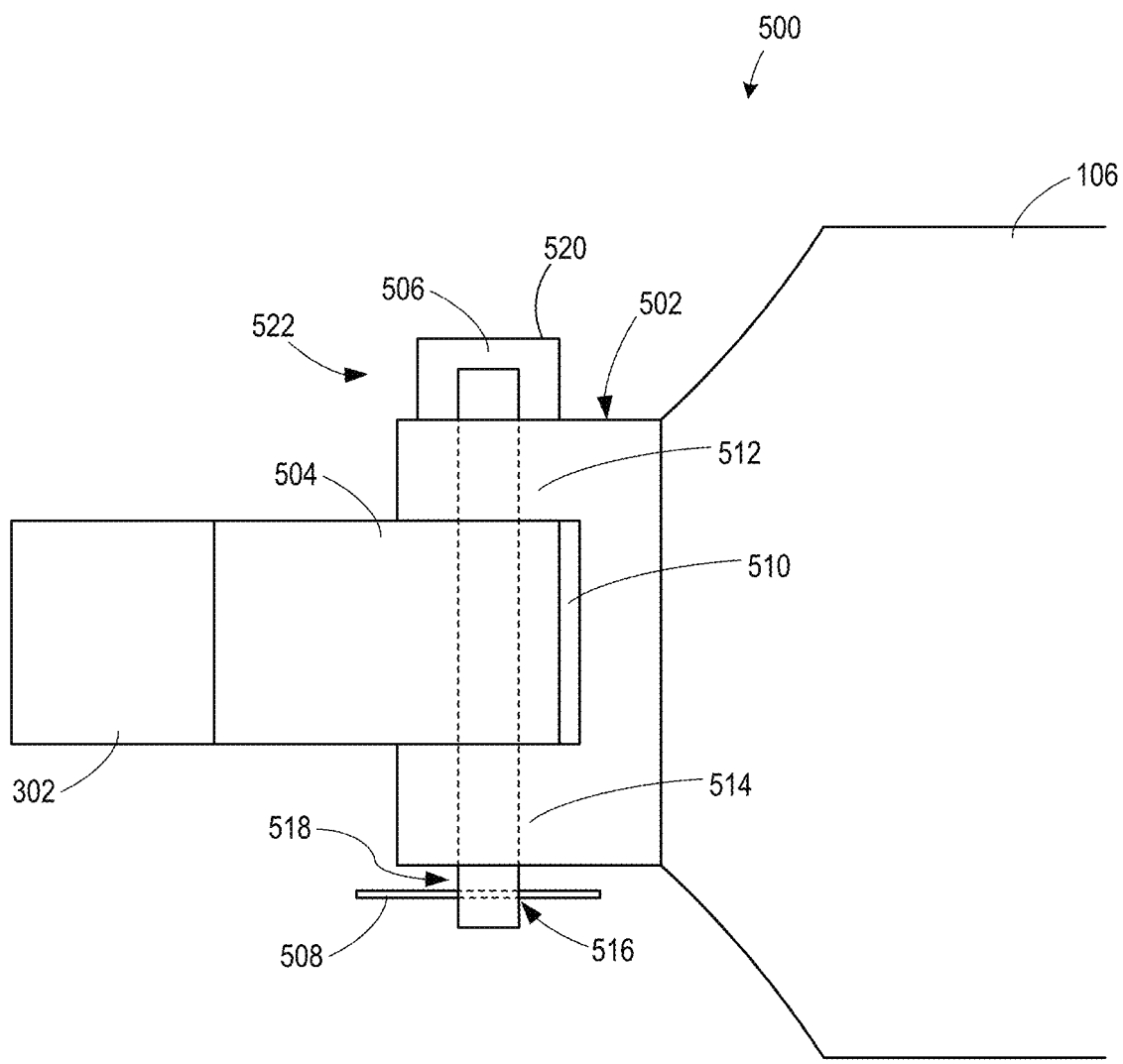
FIG. 5 is an enlarged view of an example connector disclosed herein for coupling an example brace and an example aircraft disclosed herein.

FIG. 5 is an enlarged view of an example connector 500 disclosed herein for coupling the example brace 302 (e.g., and/or the example braces 302b-302f) disclosed herein to the example aircraft 100 (shown in FIG. 1). Each of the first end 310 and the second end 312 of the brace 302 of the illustrated example can include the connector 500. For example, a first one of the connector 500 can couple the first end 310 of the brace 302 and the wing 300 and a second one of the connector 500 can couple the second end 312 of the brace 302 and the fuselage 106. In the illustrated example, the connector 500 is a clevis and lug assembly 500. The clevis and lug assembly 500 of the illustrated example includes a clevis 502 and a lug 504. In the illustrated example, the clevis and lug assembly 500 couples and/or attaches the brace 302 and the fuselage 106. In some examples, a plurality of the clevis and lug assemblies 500 can be used to couple and/or attach the brace 302 and the fuselage 106. In this example, the fuselage 106 includes the clevis 502 and the brace 302 includes the lug 504. In other examples, the fuselage 106 includes the lug 504 and the brace 302 includes the clevis 502. The clevis 502 of the illustrated example is a C-shaped fitting that includes a first flange 512 and a second flange 514. As shown in FIG. 5, the clevis 502 includes a cavity 510 between the first flange 512 and the second flange 514 that receives the lug 504. The lug 504 contains a hole to receive a pin 506. In some examples, a plurality of pins 506 hold and/or lock the lug 504 and the clevis 502. Further, the first flange 512 and the second flange 514 of the clevis 502 include holes that align (e.g., coaxially align) with one another and the hole of the lug 504. The hole included in the lug 504 and the holes included in the first flange 512 and the second flange 514 of the clevis 502 align (e.g., coaxially) to receive the pin 506 when the clevis 502 receives the lug 504. In some examples, the clevis and lug assembly 500 includes steel, aluminum, fiberglass, titanium and/or carbon fiber. The pin 506 of the illustrated example includes a hole 516 at a first end 518 to receive a locking clip 508 and a head 520 at a second end 522 opposite the first end 518. The locking clip 508 retains the pin 506 coupled to the clevis 502 and the lug 504. The pin 506 and the head 520 capture or clamp the clevis 502 and the lug 504. In some examples, the clip 508 is formed of stainless steel. In other examples, the first end 518 of the pin 506 includes a thread (not shown in this view) to receive a nut to lock or retain the pin 506 coupled to the clevis 502 and the lug 504. In some examples, the nut is tightened onto the first end 518 of the pin 506 to clamp together the first flange 512 and the second flange 514 of the clevis 502 and hold the lug 504.

Additionally, the clevis and lug assembly 500 is implemented to couple and/or attach the first end 310 (shown in FIG. 3) to the wing 300 (FIG. 3). In some examples, the wing 300 includes the clevis 502 and the brace 302 at the first end 310 includes the lug 504. In other examples, the brace 302 at the first end 310 includes the clevis 502 and the wing 300 includes the lug 504. In some examples, a plurality of the clevis and lug assemblies 500 can be used to couple and/or attach the first end 310 and the wing 300. Although, the clevis and lug assembly 500 coupling (e.g., fastening, attachment, connector, etc.) mechanism is shown here, any other type of coupling (e.g., fastening, attachment, connector, etc.) mechanism may be implemented to couple (fasten, attach, connect, etc.) the brace 302 (shown in FIG. 3) to the fuselage 106 and or the wing 300 (shown in FIG. 3).

The example aircraft 100 experiences different load conditions due to gravitational forces (G-force) when on the ground and when in flight. As used herein "g" means gravitational force. For example, when the aircraft 100 is on the ground, the aircraft 100 can experience a 1 g on ground condition with no air load. The gravitational force is attractive and a downward force toward the center of the earth, and forces on the landing gear of the aircraft 100 are upward forces and are a reaction against the downward force. The 1 g on ground condition, due to the weight of the wing 300 from the downward force of gravity, causes the wing 300 to tend to sag or deflect downward, and thus a length or slack of the strut 406 (e.g., or the struts 414, 418, 420, 422, 424, 430, 432, etc.) tends to shorten.

In flight, the aircraft 100 can experience a 2.5 g up-bending of wing flight condition. In the 2.5 g up-bending of wing flight condition, an air load on the wing 300 in an upward direction can cause the wing to bend upward, which tends to cause the strut 406 (e.g., or the struts 414, 418, 420, 422, 424, 430, 432, etc.) to lengthen and/or causes the strut 406 (e.g., or the struts 414, 418, 420, 422, 424, 430, 432, etc.) to be in tension. Further, when the aircraft 100 is in flight, the aircraft 100 can experience a minus 1 g (−1 g) pushover flight condition that can cause the wing 300 to bend downward and/or shorten a length of the slack of the strut 406 (e.g., or the struts 414, 418, 420, 422, 424, 430, 432, etc.).

In some instances, a slack of the strut 406 (e.g., or the struts 414, 418, 420, 422, 424, 430, 432, etc.) can be adjusted (e.g., retracted or provided) to maintain and/or adjust tension within the strut 406 (e.g., when the wing 300 experiences minus 1 gforces). In some examples, a slack of the strut 406 (e.g., or the struts 414, 418, 420, 422, 424, 430, 432, etc.) is stored within the wide connection 120 (shown in FIG. 1). In other examples, the slack of the strut 406 is stored within the fuselage 106. In some examples, adjusting tension can be achieved by adjusting a length of the strut to provide a preload tension in the strut 406 (e.g., or the struts 414, 418, 420, 422, 424, 430, 432, etc.) when attaching the strut 406 (e.g., or the struts 414, 418, 420, 422, 424, 430, 432, etc.) to the wing 300 and the fuselage 106 of the aircraft 100. In some examples, a slack of the strut 406 can be adjusted (e.g., retracted or given) by a means for adjusting tension.

In some examples, adjusting tension can be achieved by including a slider, tensioner and/or a biasing element (e.g., one or more springs (e.g., tension spring(s), mechanical spring(s), linear spring(s), non-linear spring(s), compression spring(s), cantilever spring(s), torsion spring(s), leaf spring(s), hydraulic spring(s), coil spring(s), and/or any other spring(s))) positioned at the first and second ends 310, 312 (FIG. 3A).

Figure 6A:
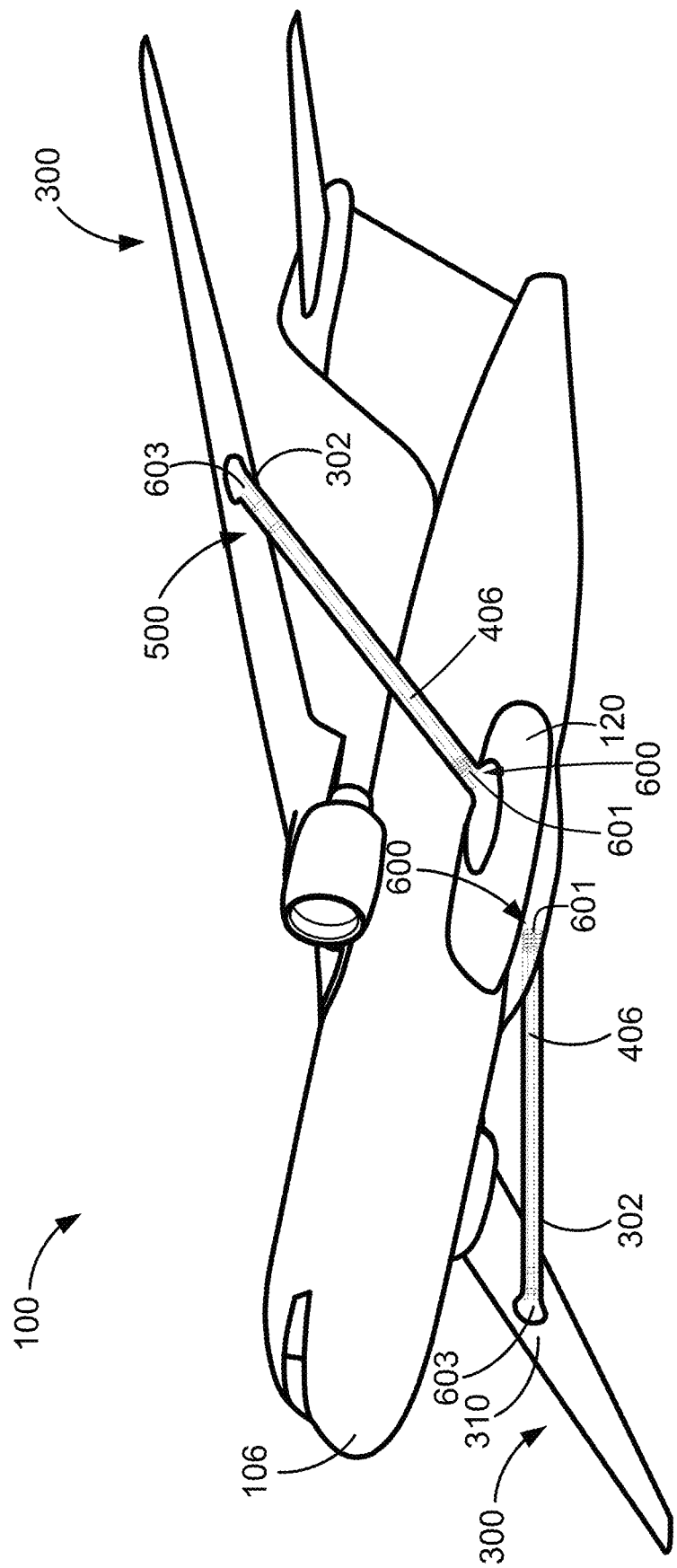
FIG. 6A is a perspective view of the example aircraft of FIG. 1 showing an example tensioner disclosed herein.
Figure 6B:
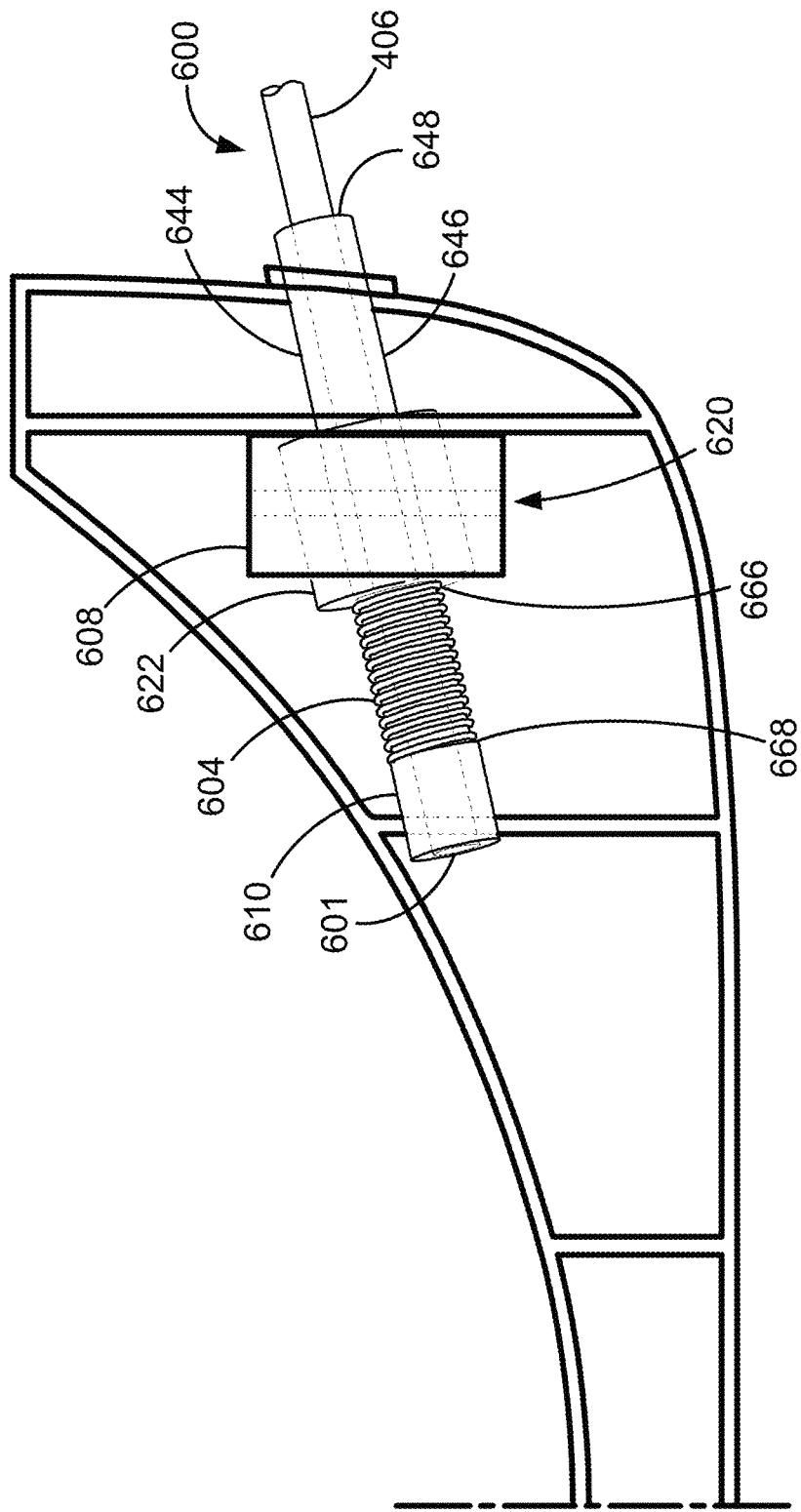
FIG. 6B illustrates an enlarged, partial front view of the example tensioner of FIG. 6A.
Figure 6C:
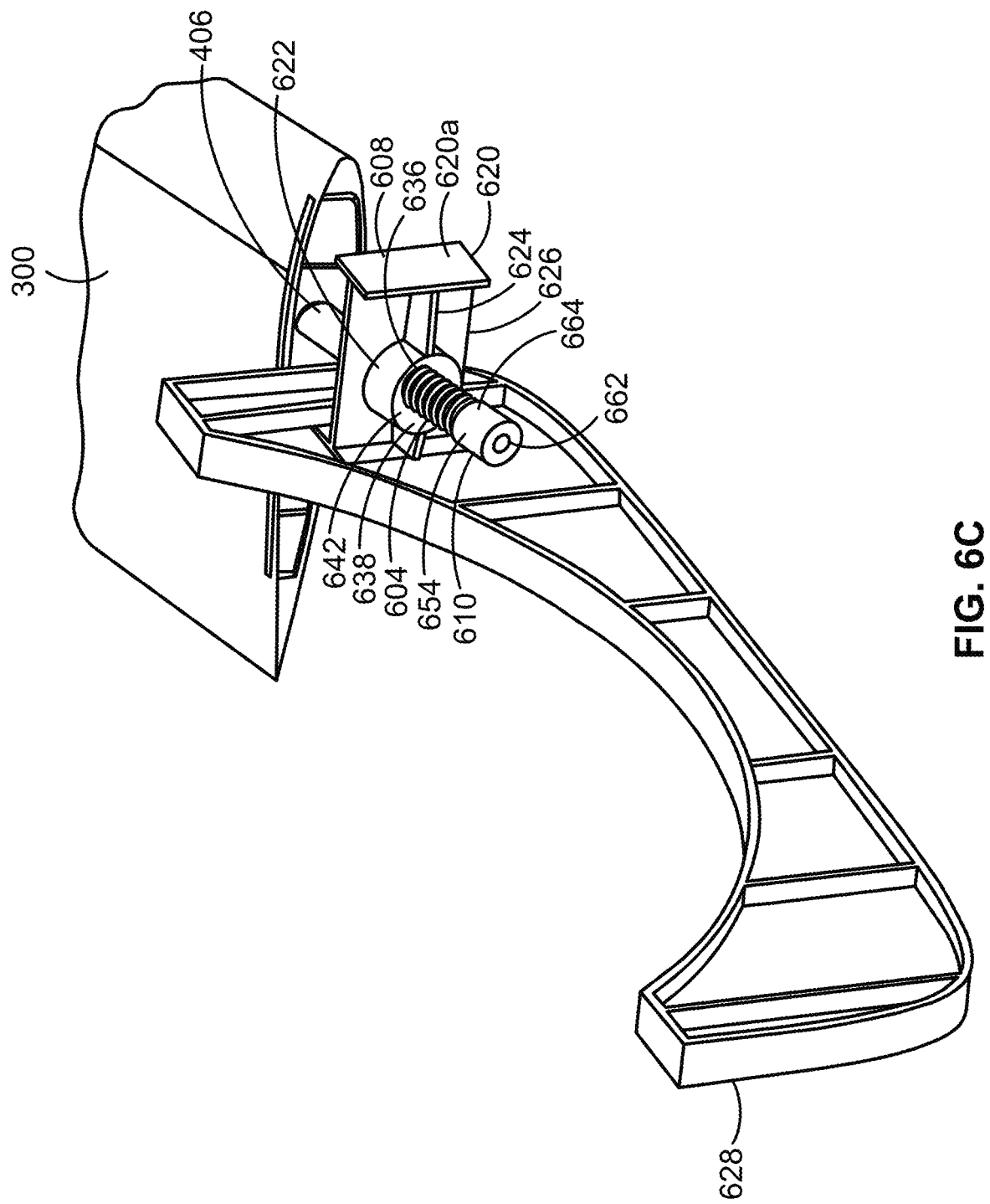
FIG. 6C illustrates a perspective view of the example tensioner of FIG. 6B.

FIG. 6A is a perspective view of the example aircraft 100 of FIG. 1 showing an example tensioner 600 (e.g., a slider) disclosed herein. FIG. 6B is a partial, front view of an example tensioner 600 of FIGS. 6A and 6B. FIG. 6C is a perspective view of the example tensioner 600 of FIG. 6B-6C. The tensioner 600 provides means for adjusting a tension and/or slack of the strut 406 (e.g., or the struts 414, 418, 420, 422, 424, 430, 432, etc.).

In the illustrated example of FIG. 6A, each brace 302 includes a tensioner 600. Specifically, the strut 406 (e.g., or the struts 414, 418, 420, 422, 424, 430, 432, etc.) of each brace 302 includes a first end 601 and a second end 603 opposite the first end 601. In the illustrated example, the first end 601 of the strut 406 attaches to the fuselage 106 via the tensioner 600 and the second end 603 of the strut 406 attaches to the wing 300 via the connector 500 of FIG. 5. In other examples, the connector 500 couples the second end 603 of the strut 406 (e.g., or the struts 414, 418, 420, 422, 424, 430, 432, etc.) and the fuselage 106 and the tensioner 600 couples the second end 603 of the strut 406 (e.g., or the struts 414, 418, 420, 422, 424, 430, 432, etc.) and the wing 300. In some examples, the tensioner 600 couples the first end 601 of the strut 406 (e.g., or the struts 414, 418, 420, 422, 424, 430, 432, etc.) and the fuselage 106 and a second tensioner 600 couples the second end 603 of the strut 406 (e.g., or the struts 414, 418, 420, 422, 424, 430, 432, etc.) and the wing 300. In some examples, the tensioner 600 can be coupled to the connector 500 such that the tensioner 600 and the connector 500 couple the first end 601 of the strut 406 (e.g., or the struts 414, 418, 420, 422, 424, 430, 432, etc.) and the fuselage 106 and/or couples the second end 603 of the strut 406 (e.g., or the struts 414, 418, 420, 422, 424, 430, 432, etc.) and the wing 300.

Referring to FIGS. 6B and 6C, the tensioner 600 includes a spring 604 (e.g., a compression spring) disposed on and/or adjacent the first end 601 of the strut 406. The spring 604 is positioned between a first fitting 608 (e.g., a side-of-body fitting) and a second fitting 610 (e.g., an end cap). The first fitting 608 is a flange that extends (e.g., is cantilevered from or orthogonal) from a bulkhead or frame 628 of the fuselage 106 (FIG. 6A). The first fitting 608 includes a load spanning beam 620. The first fitting 608 of the illustrated example is an I-beam having a I-beam portion 620a, a cylindrical portion 622 inserted, or formed, through and fixedly attached to the I-beam portion 620a, and rib elements 624. The cylindrical portion 622 of the first fitting 608 has a through opening 636 and a bearing surface 638. The bearing surface 638 functions as a stop and/or a first spring seat 642 for the biasing element 604.

Referring to FIG. 6B, the tensioner 600 of the illustrated example includes a bushing 644. In the illustrated example, the bushing 644 is a tube 646 disposed within the through opening 636 of the first fitting 608 such that an exterior surface of the bushing 644 is in contact with or against an interior surface of the through opening 636 of the first fitting 608. The bushing 644 of the illustrated example has an opening 648 to receive (e.g., slidably receive) at least a portion of the strut 406 (e.g., the first end 601 of the strut 406). The portion of the strut 406 of the illustrated example extends through the opening 648 of the bushing 644 and the through opening 636 of the first fitting 608.

The second fitting 610 of the illustrated example axially aligns with the first fitting 608 along a longitudinal axis of the strut 406. In the illustrated example, the second fitting 610 is coupled or attached to (e.g., fixed to) the first end 601 of the strut 406. The second fitting 610 of the illustrated example is a cap or tube 654. The second fitting 610 has a through opening 662 to receive the first end 601 of the strut 406 (e.g., that extends through the second fitting 610). The second fitting 610 includes a bearing surface 664. The bearing surface 664 provides a second spring seat for the biasing element 604. Thus, the biasing element 604 is provided or positioned between the spring seat 642 provided by the first fitting 608 and the spring seat 664 provided by the second fitting 610. Thus, the bearing surface 664 of the second fitting 610 bears directly against a second end 668 of the spring 604 and the bearing surface 638 of the first fitting 608 bears directly against a first end 666 of the spring 604. In operation, to adjust slack in the strut 406, the second fitting 610 moves relative to (e.g., towards or away) the first fitting 608 in a an axial direction relative to the longitudinal axis of the strut 406. In other words, when tension increases in the strut 406, the second fitting 610 moves toward the first fitting 608 to compress the biasing element 604 between the first fitting 608 and the second fitting 610. When tension decreases in the strut 406, the second fitting 610 moves away from the first fitting 608 via extension of the biasing element 604. For example, when the aircraft 100 is on the ground or in flight (e.g., between-1 g down-bending of wing flight condition and a 2.5 g up-bending of wing flight condition), conditions can cause tension and/or compression in the strut 406. Slack within the strut 406 can be adjusted (e.g., increased or decreased) via movement (e.g., compression or extension) of the spring 604 between the first fitting 608 and the second fitting 610 to accommodate various wing flight conditions. For example, the movement of the strut 406 can be based on a small displacement of the spring 604. The second end 603 of the strut 406 being fixed to the wing 300 causes the first end 601 of the strut 406 to move relative to the first fitting 608 when the wing 300 bends between an initial position and either an upward or downward position. For example, when the wing 300 is in an initial position, the biasing element 604 is in an initial or extended position. Conversely, when the wing 300 bends upward or downward, the biasing element 604 is in a compressed position.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, apparatus, and articles of manufacture have been disclosed that reduce the drag and weight of transonic aircraft. Disclosed systems, apparatus, articles of manufacture, and methods improve the efficiency of transonic aircraft by improving fuel efficiency and reducing noise caused by drag force. Disclosed systems, apparatus, articles of manufacture, and methods are accordingly directed to one or more improvement(s) in the operation of a transonic aircraft.

Although each example brace, strut, connector and/or wing disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Example apparatus to stabilize wings of transonic aircraft are disclosed herein. Further examples and combinations thereof include the following:

Example 1 includes an aircraft comprising a brace to support a wing of the aircraft, the brace including a first end coupled to the wing and a second end coupled to a fuselage of the aircraft, the brace including a strut extending between the first end and the second end, and an airfoil having a cavity containing the strut.

Example 2 includes the aircraft as defined in example 1, wherein a first end of the brace is attached to the fuselage and a second end of the brace is attached to the wing.

Example 3 includes the aircraft as define in any one of examples 1-2, wherein the first end of the brace is coupled to a midpoint of the wing.

Example 4 includes the aircraft as defined in any one of examples 1-3, wherein the wing includes a wing tip and the first end of the brace is coupled halfway between a midpoint of the wing and the wing tip.

Example 5 includes the aircraft as defined in any one of examples 1-4, wherein the wing includes a wing tip and the first end of the brace is coupled to the wing at a location two-thirds of a distance in a spanwise direction between a midpoint of the wing and the wing tip, the location closer to the midpoint compared to the wing tip.

Example 6 includes the aircraft as defined in any one of examples 1-5, wherein the strut is composed at least partially of flexible material.

Example 7 includes the aircraft as defined in any one of examples 1-6, wherein the strut is in substantial tension when coupled to the aircraft and the wing.

Example 8 includes the aircraft as defined in any one of examples 1-7, wherein the strut cross-section is circular.

Example 9 includes the aircraft as defined in any one of examples 1-8, wherein the strut cross-section is oval.

Example 10 includes the aircraft as defined in any one of examples 1-9, wherein the strut shape is a wedge and the strut cross-section is triangular.

Example 11 includes the aircraft as defined in any one of examples 1-10, wherein the cavity of the airfoil extends between a first end of the airfoil and a second end of the airfoil.

Example 12 includes the aircraft as defined in any one of examples 1-11, wherein the strut is composed at least partially of steel.

Example 13 includes the aircraft as defined in any one of examples 1-12, wherein the strut includes metal fibers.

Example 14 includes the aircraft as defined in any one of examples 1-13, wherein the brace is coupled to the fuselage via a clevis connection and the fuselage includes a clevis and the brace includes a lug, the lug coupled to the clevis with a pin.

Example 15 includes the aircraft as defined in any one of examples 1-14, where the strut cross-section is an irregular polygonal.

Example 16 includes the aircraft as defined in any one of examples 1-15, where the brace includes at least two circular struts.

Example 17 includes the aircraft as defined in any one of examples 1-16, where the brace includes at least three circular struts.

Example 18 includes the aircraft as defined in any one of examples 1-17, where the first end of the brace is coupled to a point of the wing inboard of an engine.

Example 19 includes the aircraft as defined in any one of examples 1-18, where the first end of the brace is coupled to a point of the wing outboard of an engine.

Example 20 includes the aircraft as defined in any one of examples 1-19, where the first end of the brace is coupled halfway between a midpoint of the wing and the fuselage.

Example 21 includes the aircraft as defined in any one of examples 1-20, where the strut is composed of at least partially co-polymer fiber.

Example 22 includes an aircraft comprising a fuselage, a wing-to-fuselage structural attachment coupled to the fuselage, a wing including a wing tip and an attachment end opposite the wing tip, the attachment end coupled to the wing-to-fuselage structural attachment, the wing to extend from the fuselage, a cable having a first end attached to the wing and a second end attached to the fuselage, and a cover positioned over the cable, the cover having an aerodynamic surface.

Example 23 includes the aircraft as defined in any one of examples 22, wherein the first end of the cable is attached at a midpoint of the wing between the wing tip and the attachment end in the spanwise direction.

Example 24 includes the aircraft as defined in any one of examples 22-23, wherein the first end of the cable is attached to the wing at a position two-thirds of a distance in the spanwise direction between a midpoint of the wing and the wing tip, the position closer to the midpoint compared to the wing tip.

Example 25 includes the aircraft as defined in any one of examples 22-24, wherein the fuselage includes a clevis, and the first end of the cable includes a lug coupled to the clevis with a pin.

Example 26 includes an aircraft wing stabilizer apparatus comprising means for attaching a first end of a brace to a fuselage, means for attaching a second end of the brace opposite the first end to a wing, means for stabilizing the first end of the brace to the second end of the brace to provide tension in the brace.

Example 27 includes the aircraft wing stabilizer as defined in example 26, wherein the second end of the means for attaching is coupled at a midpoint of the wing between a wing tip and an attachment end opposite the wing tip.

Example 28 includes the aircraft wing stabilizer as defined in any one of examples 26-27, further including a lifting means to cover the brace, the lifting means including an aerodynamic surface structured to at least one of generate lift or reduce drag.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An aircraft comprising:
  a brace to support a wing of the aircraft, the brace including:
    a strut having a first end to attach to the wing and a second end to attach to a fuselage, the strut being flexible to adjust a tension of the strut, the first end of the strut to attach to the wing via a first clevis connection, the wing includes a first clevis, the first end of the strut includes a first lug, the first lug to couple to the first clevis via a first pin; and
    an airfoil having a cavity containing the strut, the strut positioned toward a leading edge of the brace such that the leading edge of the brace has a greater weight than a trailing edge of the brace to reduce flutter.

2. The aircraft as defined in claim 1, wherein the wing includes a wing tip and the first end of the strut brace is coupled halfway between a midpoint of the wing and the wing tip.

3. The aircraft as defined in claim 1, wherein the wing includes a wing tip and the first end of the strut brace is coupled to the wing at a location two-thirds of a distance in a spanwise direction between a midpoint of the wing and the wing tip, the location closer to the midpoint compared to the wing tip.

4. The aircraft as defined in claim 1, wherein the strut is a cable composed at least partially of flexible material.

5. The aircraft as defined in claim 1, wherein the strut is in tension when coupled to the aircraft and the wing.

6. The aircraft as defined in claim 1, wherein the strut a cross-section of the strut is circular.

7. The aircraft as defined in claim 1, wherein the strut cross-section is oval.

8. The aircraft as defined in claim 1, wherein the strut shape is a wedge and the strut cross-section is triangular.

9. The aircraft as defined in claim 1, wherein the first end of the strut brace is coupled to a point of the wing inboard of an engine.

10. The aircraft as defined in claim 1, wherein the first end of the strut is coupled adjacent a midpoint of the wing and the fuselage.

11. The aircraft as defined in claim 1, wherein the strut is positioned closer to a leading edge of the airfoil relative to a trailing edge of the airfoil.

12. The aircraft as defined in claim 1, wherein the brace has a weight distribution that is at least one of forward of a center of gravity of the brace or forward of aerodynamic forces of the brace.

13. An aircraft comprising:
  a fuselage;
  a wing-to-fuselage structural attachment coupled to the fuselage;
  a wing including a wing tip and an attachment end opposite the wing tip, the attachment end coupled to the wing-to-fuselage structural attachment, the wing to extend from the fuselage;
  a cable having a first end attached to the wing and a second end attached to the fuselage, the cable being flexible to adjust a tension of the cable, the first end of the cable is attached to the wing via a first clevis connection, the wing includes a first clevis, the first end of the cable includes a first lug, the first lug to couple to the first clevis via a first pin; and
  a cover positioned over the cable, the cover having an aerodynamic surface.

14. The aircraft as defined in claim 13, wherein the first end of the cable is attached at a midpoint of the wing between the wing tip and the attachment end in a spanwise direction.

15. The aircraft as defined in claim 13, wherein the second end of the cable is attached to the fuselage via a clevis connection, wherein the fuselage includes a clevis, and the second end of the cable includes a lug, the lug to couple to the clevis with a pin.

16. The aircraft as defined in claim 13, further including a tensioner to reduce slack within the cable when the cable is coupled to the aircraft.

17. The aircraft as defined in claim 13, wherein the second end of the cable is attached to the fuselage via a tensioner, the tensioner to adjust a slack of the cable strut when the cable strut is coupled to the aircraft.

18. The aircraft as defined in claim 17, wherein the tensioner includes a spring positioned along at least a portion of the second end of the cable, the spring clamped between a first fitting and a second fitting, the first fitting to the receive the cable, the second fitting to couple to the second end of the cable.

* * * * *